United States Patent
Struyk

(10) Patent No.: US 9,035,781 B2
(45) Date of Patent: May 19, 2015

(54) APPARATUS AND METHOD FOR AUTOMATICALLY DETECTING AND ALERTING OF GAS-OUT CONDITIONS FOR A GAS APPLIANCE DURING OPERATION

(75) Inventor: David A. Struyk, Deephaven, MN (US)

(73) Assignee: WATERSTRIKE INCORPORATED, Excelsior, MN (US)

( * ) Notice: Subject to any disclaimer, the term of this patent is extended or adjusted under 35 U.S.C. 154(b) by 460 days.

(21) Appl. No.: 13/561,514

(22) Filed: Jul. 30, 2012

(65) Prior Publication Data

US 2012/0293335 A1 Nov. 22, 2012

Related U.S. Application Data

(63) Continuation-in-part of application No. 12/255,267, filed on Oct. 21, 2008, now Pat. No. 8,264,361, and a continuation-in-part of application No. 12/254,293, filed on Oct. 20, 2008, now Pat. No. 8,264,360.

(60) Provisional application No. 61/009,725, filed on Dec. 29, 2007.

(51) Int. Cl.
*G08B 21/00* (2006.01)
*G01P 13/00* (2006.01)
*H01H 35/40* (2006.01)

(52) U.S. Cl.
CPC ............ *G01P 13/002* (2013.01); *H01H 35/405* (2013.01)

(58) Field of Classification Search
CPC ........ F17C 1/00; F17C 7/00; F17C 2201/019; F17C 2270/07; F17C 2270/0709
USPC ......... 340/603, 605, 606, 608, 610, 611, 612, 340/614, 626, 632; 73/1.16, 1.19, 1.21, 73/1.22, 1.23, 861
See application file for complete search history.

(56) References Cited

U.S. PATENT DOCUMENTS

| | | | | |
|---|---|---|---|---|
| 3,446,986 | A | * 5/1969 | Cox | .............................. 307/118 |
| 3,678,881 | A | 7/1972 | Shinn | |
| 3,700,904 | A | * 10/1972 | Stobble et al. | ................ 250/575 |
| 4,181,835 | A | 1/1980 | Stadler et al. | |
| 4,207,563 | A | 6/1980 | Soupal | |
| 4,213,021 | A | 7/1980 | Alexander | |
| 4,372,147 | A | * 2/1983 | Waugh et al. | .................. 73/1.17 |
| 4,435,626 | A | 3/1984 | Coffin | |
| 4,500,759 | A | 2/1985 | deFasselle et al. | |
| 4,513,184 | A | 4/1985 | Hughes | |
| 4,630,360 | A | 12/1986 | Ochsner et al. | |
| 4,739,135 | A | 4/1988 | Custer | |

(Continued)

*Primary Examiner* — Steven Lim
*Assistant Examiner* — Ryan Sherwin
(74) *Attorney, Agent, or Firm* — Schroeder & Siegfried, P.A.

(57) ABSTRACT

A gas appliance monitoring apparatus for automatically detecting and alerting to a "gas-out" condition of a gas appliance during operation, and/or for alerting to the presence of prolonged "gas-on" conditions of an appliance. The apparatus utilizes a highly sensitive low loss and low flow gas flow indicator with multiple flow sensors to monitor the gas flow characteristics of the appliance during use. A gas flow analyzer and alarm timing mechanism analyzes the gas flow characteristics and sounds an alarm at the appliance or wirelessly at a remote location upon detection of either of the above conditions. A biasing attraction magnet is incorporated in the fluid flow indicator to offset either the force of gravity or a return spring in low flow/low pressure applications. The piston is sealed for use in high pressure/low flow applications, and provided with a vent hole for residual gas bleed-off upon a stoppage of gas flow.

19 Claims, 12 Drawing Sheets

(56) References Cited

U.S. PATENT DOCUMENTS

| | | |
|---|---|---|
| 4,763,114 A | 8/1988 | Eidsmore |
| 4,823,838 A | 4/1989 | Ferlin |
| 4,930,488 A | 6/1990 | Pearman et al. |
| 4,996,396 A | 2/1991 | Smith |
| 5,003,960 A | 4/1991 | Hanagan |
| 5,018,964 A | 5/1991 | Shah |
| 5,019,678 A | 5/1991 | Templeton et al. |
| 5,033,449 A | 7/1991 | Hanagan |
| 5,070,220 A | 12/1991 | Glenn |
| 5,191,317 A | 3/1993 | Toth et al. |
| 5,333,596 A | 8/1994 | Clifford |
| 5,416,294 A | 5/1995 | Glenn |
| 5,608,383 A | 3/1997 | Neil |
| 5,617,840 A | 4/1997 | Clifford |
| 5,628,242 A | 5/1997 | Higley |
| 5,659,295 A | 8/1997 | Renfroe et al. |
| 5,692,215 A | 11/1997 | Kutzik et al. |
| 5,813,394 A | 9/1998 | Clifford |
| 6,114,823 A | 9/2000 | Doner et al. |
| 6,121,884 A | 9/2000 | Ekermans |
| 6,155,160 A | 12/2000 | Hochbrueckner |
| 6,289,792 B1 | 9/2001 | Grando |
| 6,338,279 B1 | 1/2002 | Tsataros |
| 6,472,624 B1 | 10/2002 | Harris et al. |
| 6,528,748 B2 | 3/2003 | Harris et al. |
| 6,684,757 B2 | 2/2004 | Petersen |
| 6,733,276 B1 | 5/2004 | Kopping |
| 6,741,179 B2 | 5/2004 | Young |
| 6,832,620 B2 | 12/2004 | Jaeger |
| 6,914,532 B2 | 7/2005 | Crooks et al. |
| 7,105,757 B2 | 9/2006 | Valentini |
| 7,117,893 B1 | 10/2006 | Krupa |
| 7,197,407 B2 | 3/2007 | Schimnowski et al. |
| 7,207,780 B2 | 4/2007 | Bach |
| 7,298,280 B2 * | 11/2007 | Voege et al. ............ 340/606 |
| 7,471,259 B2 | 12/2008 | Wrathall et al. |
| 7,654,127 B2 * | 2/2010 | Krulevitch et al. ........ 73/1.16 |
| 7,793,914 B2 | 9/2010 | Danielson |
| 7,859,144 B1 | 12/2010 | Sahyoun |
| 2002/0101355 A1 | 8/2002 | Young |
| 2005/0248465 A1 | 11/2005 | Flaherty |
| 2006/0118181 A1 * | 6/2006 | Landon ............... 137/624.12 |
| 2008/0006095 A1 * | 1/2008 | Kirchner et al. .......... 73/861 |
| 2010/0066549 A1 * | 3/2010 | Tsung .................. 340/626 |
| 2010/0097232 A1 * | 4/2010 | Lee et al. ............... 340/626 |

* cited by examiner

APPARATUS AND METHOD FOR AUTOMATICALLY DETECTING AND ALERTING OF GAS-OUT CONDITIONS FOR A GAS APPLIANCE DURING OPERATION

CROSS REFERENCE TO RELATED APPLICATIONS

This application is a continuation-in-part of and claims the benefit of U.S. patent application Ser. Nos. 12/255,267 and 12/254,293, both filed Oct. 21, 2008, and both of which claim the benefit of prior U.S. Provisional Patent Application No. 61/009,725, filed on Dec. 29, 2007 by the same inventor, namely, David A. Struyk. The entire disclosures of each of the above applications are incorporated herein by reference.

BACKGROUND OF THE INVENTION

The present invention relates generally to the field of gas appliance monitoring systems. More particularly, the present invention relates to a gas appliance monitoring system and alarm timing mechanism for automatically detecting and alerting to a "gas-out" condition of a gas appliance during operation, and/or for alerting to the presence of sustained gas flow after a predetermined period of time.

Gas-operated appliances, such as barbecue grills, deck heaters, fireplaces, and the like have become commonplace. The availability of either natural or propane gas as a fuel makes these appliances particularly convenient. However, it is commonplace for the users of such appliances to (1) run out of gas during operation of the appliance, and/or (2) accidentally leave the appliance turned on long after their intended period of use. It is most inconvenient and irritating when the gas supply expires during use of the appliance. In the case of a barbecue grill, the user will generally have no idea as to how long the event has occurred, possibly ruining the meal. Leaving an appliance on too long is also frustrating, as this leads to an expensive waste of fuel, the inconvenience of refilling portable gas tanks, and a considerable safety hazard. The problem is magnified when the appliances are plumbed directly to the available natural gas supply or household propane tank.

With millions of gas grills and other gas appliances being sold around the world each year, clearly an effective signaling/safety device capable of detecting and alerting to a gas-out condition during operation is desirable. It would also be beneficial for such a system to alert for the presence of sustained gas flow after a predetermined period of time. Automatic versus manual operation of such a system is also deemed desirable, in that in that the user should not have to enable it at the beginning of the grilling cycle, or disable it at the end. A system that is not automatic is less likely to get used, and an automatic system can provide the best power conservation, which is important in a battery powered system.

Others have heretofore attempted to provide alerts of gas-out conditions of a gas appliance during use. One known system utilizes a single sensor to monitor gas supply pressure to alert of low fuel, but this system must be manually activated upon each usage. Automatic operation with such a single sensor system is not possible, as there is no way for the system to know that the appliance is actually operating (i.e., gas is flowing). Since these systems lack a gas flow sensor or knob position/gas valve activation sensor, they cannot be automatically activated or deactivated when the appliance is turned on or off by simply utilizing the appliance controls.

In U.S. Pat. Nos. 5,003,960 and 5,033,449, a device is disclosed which electronically weighs the tank and then calculates and displays the amount of time remaining before gas expiration. An alarm is set off when the calculated time is low enough and/or a flame detector senses the flame has stopped while the tank weight is low. This is a potentially very dangerous approach, however, as the system cannot discern a situation where the flame has stopped and the gas is still flowing. A flame detector does provide a positive indication of gas flow, but the converse is not true, i.e., it cannot provide a positive indication that the flow of gas has stopped.

From the above, it is evident there is a distinct need for a gas appliance monitoring system which will automatically detect and alert to gas-out conditions during appliance operation. It would also be beneficial if such a system could also detect the presence of sustained gas flow after a predetermined period of time, without the need for manual system reset. Obviously, it would be desirable to offer these features, either alone or combined, in both aftermarket and original equipment manufacturer (OEM) versions. Finally, any such system must also provide for reliable detection of appliance operation to avoid false alarm situations.

It is therefore an object of the present invention to provide an OEM and aftermarket gas appliance monitoring system which will automatically and reliably detect and alert to gas-out conditions during appliance operation, and to the presence of sustained gas flow after a predetermined period of time.

It is also an object of the present invention to detect gas-out conditions of an appliance without the use of pressure sensors, tank scales, or a combination thereof, by utilizing a highly sensitive flow indicator/switch to automatically detect the difference in gas flow characteristics between an appliance that is intentionally turned off versus an appliance that experiences a gas-out condition during operation.

It is another object of the present invention to provide a novel configuration of a piston-type positive displacement fluid flow indicator/switch which is highly sensitive and useful for detecting the flow of gas, and thus operation of the appliance, in low flow applications, such as with gas grills and the like, and which will function accurately in such a gas appliance monitoring system without significant pressure loss, flow restriction or piston oscillation.

It is still a further object of the present invention to provide a novel and useful fluid flow indicator which (1) utilizes multiple detection sensors/switches to monitor timing differences in piston movement under different operating conditions to determine and alert for gas-out conditions during operation, and/or (2) includes a timer, alarm system and optional activity sensor for alerting to the presence of sustained gas flow after a predetermined period of time.

BRIEF SUMMARY OF THE INVENTION

It will be noted that the present invention has particular application in the field of gas-operated appliances, such as gas grills, gas patio heaters, gas fireplaces, and the like. For ease of illustration, however, the discussion hereafter will be limited primarily to the context of a gas grill, it being understood that the principles of the present invention apply equally to all gas appliances.

The present invention provides and apparatus and method for automatically detecting and alerting to a gas-out condition of a gas appliance during operation, and/or for indicating a "grill-on" condition of the appliance (i.e., the presence of sustained gas flow after a predetermined period of time). It is the goal of this invention to make both the "gas-out" and the "grill-on" alarms automatic, in that the user should not have to enable them at the beginning of the grilling cycle, or disable them at the end. Such an automatic system, however, requires the input of at least two (2) sensors; one to detect that the grill is actually in use and the other to determine that the gas supply has stopped prematurely.

Since accurate detection of appliance operation is paramount in either case, the use of a highly sensitive piston-type positive displacement gas flow indicator/switch is contemplated. The gas flow indicator is of an inline, coaxial design, incorporating a lightweight piston that travels in a close fitting cylinder. The piston is designed to move between a closed resting or "gas off" position and an open "gas on" position in response to changes in gas pressure within the gas flow indicator. A first electronic flow sensor/switch (e.g., electronic reed switch or Hall effect sensor) is positioned adjacent the outlet ports of the gas flow indicator and is activated via a magnet carried in the piston when gas begins to flow through the outlet ports of the gas flow indicator (the "on" sensor). A second similar electronic flow sensor/switch is located adjacent the "resting" position of the piston, and is activated via the magnet carried in the piston only when no sustained gas is flowing thorough the cylinder (the "off" sensor).

When gas begins to flow, a pressure differential forms across the piston, causing the piston to move from the "gas off" position to the "gas on" position. In this situation, the "on" sensor is activated and the "off" sensor becomes deactivated. If gas is intentionally turned off, pressure across the piston stabilizes quickly and the piston returns to its "gas off" position very rapidly (i.e., about 1-2 seconds). The "on" sensor then deactivates and the "off" sensor is activated.

However, when the appliance runs out of gas, the supply pressure decreases more slowly. In this case, as the gas supply pressure drops, the piston closes the outlet ports but does not return to its "gas off" position until the remaining gas supply bleeds off through or around the piston and out through the appliance control valves which remain open. The remaining supply pressure from the fuel tank therefore holds the piston in an intermediate zone where gas flow is substantially restricted and neither electronic switch is activated (i.e., the "on" sensor has now deactivated and the "off" sensor has not yet activated). Typically, when an appliance runs out of gas during operation, it is estimated to take about ten seconds or more for the remaining gas supply to fully dissipate and allow the piston to return to its "gas off" position.

By utilizing separate electronic switches located adjacent the "gas on" and "gas off" positions of the fluid flow indicator, and monitoring the time difference between activation and deactivation of each switch, an accurate determination of a gas-out condition during operation may be detected. If the "return time" (i.e., the time from deactivation of the "on" sensor to activation of the "off" sensor) is greater than a predetermined threshold return time when the gas supply is intentionally turned off, a positive indication of a gas-out condition during operation is detected and an alarm can be activated to alert the operator.

Utilizing such a gas flow indicator as describe above has an added benefit in that it may also be coupled with an automatic timer and/or optional transmitter to indicate the flow of gas to an appliance and to automatically start a reminder timer to alert the user of the need to turn the appliance off after a predetermined period of time. After a preset time limit of appliance operation has expired, the timer either sounds an alarm or wirelessly triggers an alarm in a remote location. The receiver portion of the wireless timer may be mounted directly to the appliance (grill handle), so that the timer automatically resets when activity (cover opening or closing) is detected, indicating the appliance is still in use. An alarm can also be configured to sound when the appliance is attempted to be ignited with the cover closed, thereby avoiding a potential explosion.

The gas flow indicator of the present invention therefore allows for an efficient and cost effective means for detecting appliance "gas-out" conditions during operation without the need for pressure sensors, tank scales, or a combination thereof. The same system may also be configured to detect and alert for the presence of sustained gas flow after a predetermined period of time, without the need for manual system reset. By detecting the flow of gas, the monitoring system is automatically initialized upon appliance start-up, thereby eliminating the need for separate manual activation or deactivation.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
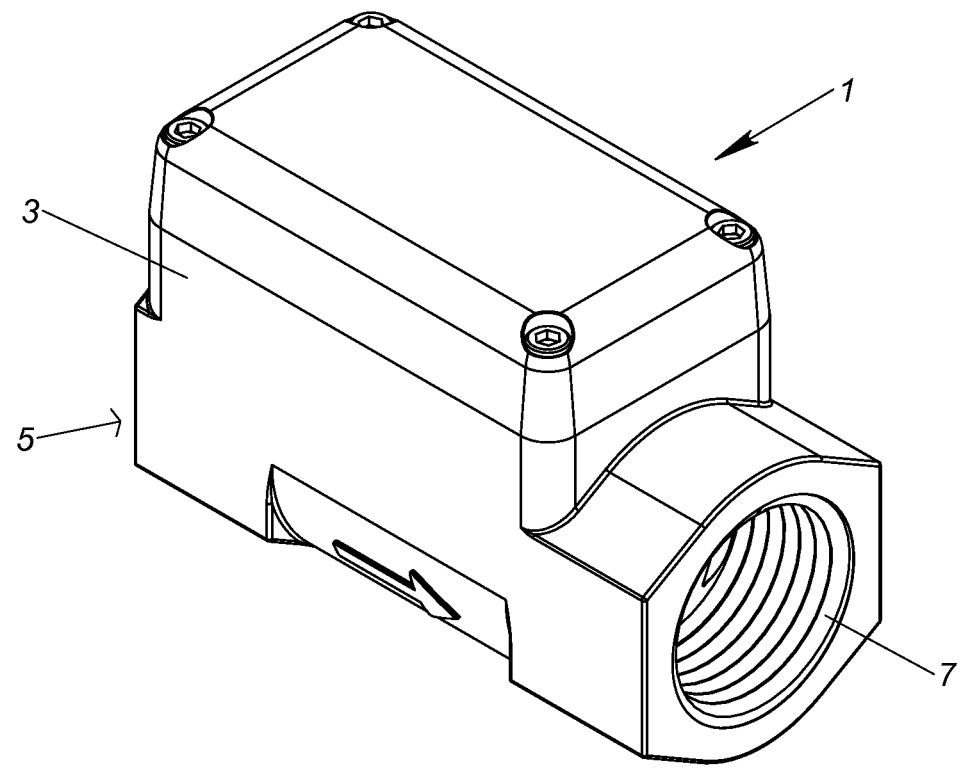
FIG. 1 is a perspective view of a gas flow indicator configured for use in low pressure/low flow applications and incorporating a flow sensor capable of detecting and alerting of "gas-on" conditions of an appliance.

As noted previously, in order to obtain the stated objectives herein, accurate detection of appliance operation is essential. While using a gas flow indicator to determine appliance operation and monitor gas supply does has an advantage in that it can reliably cover all burners, whether ignited or not, from a single location, sensing the flow of gas in a gas appliance is complicated by the fact that both the pressure and the flow rate of gas to the grill are extremely low. For instance, in a typical propane gas grill, high pressure liquefied propane is stored in a portable tank attached to the grill. The pressure in the tank varies with temperature, but may well be over 150 psi. Because of this, a low pressure regulator is required to reduce the pressure of the gas to a safe working pressure of just 11" water column (WC), which is just 0.4 psi. For natural gas systems, the pressure is even lower, typically just 7" WC, or 0.25 psi. In the case of propane, the rate of flow on the high pressure side of the regulator, due to the increased pressure, is even lower than that on the low pressure side. This makes reliable detection of the flow of gas difficult, and requires the need for highly sensitive specialized gas flow indicators capable of use either upstream or downstream of the pressure regulator.

Shown in FIGS. 1 thru 5A is one such gas flow indicator 1 configured for installation and use downstream of a typical gas grill appliance pressure regulator, or for use with household natural gas, where both the pressure and flow of gas is extremely low. The gas flow indicator 1 includes an outer housing 3 with a threaded gas inlet port 5 and threaded outlet port 7. Gas flow indicator 1 is therefore adapted to be threadably and sealably connected in vertical orientation (with inlet port 5 below the outlet port 7) inline with the gas line leading to the gas grill, downstream of the pressure regulator.

As shown in FIGS. 2 thru 5A, the outer housing 3 includes an interior bore or chamber extending therethrough within which inner cylinder 9 is seated in sealed relation via O-ring 11. Inner cylinder 9 in turn carries piston 13 within its confines in close, free-floating slip-fit relation. Adjacent the inlet end of the flow indicator 1, the housing 3 forms a radially inwardly protruding shoulder stop 15 for inner cylinder 9 and piston 13. Inner cylinder 9 is held firmly in place within housing 3 by cylinder head 17 and retaining ring 19 located adjacent the outlet end of flow indicator 1.

In the low pressure/low flow embodiment shown in FIGS. 1 thru 5A, piston 13 is uniquely designed to carry two (2) thin Neodymium switch-activating magnets, 21 and 23, rather than a single magnet. Magnets 21 and 23 are inserted from opposite ends of the piston 13, and held in place by mutual attraction, separated only by a small inwardly protruding shoulder or rib 25. This design allows for the magnets 21 and 23 to "float" slightly within a very lightweight piston 13, thus accommodating changes in temperature, and avoiding the use of messy adhesives. Recessing the magnets 21 and 23 within the piston 13 also enables them to capture by magnetic attraction small foreign metallic matter entering cylinder 9, thus preventing potential lodgment of such matter between the walls of piston 13 and cylinder 9, and consequent adverse operation of the grill.

In the present embodiment, the inner cylinder 9 includes a plurality of fluid flow orifices or gas outlet ports 29 extending through its outer wall, which communicate freely with a gas flow pathway 31 formed between the reduced outer diametrical surface 33 of inner cylinder 9 and the inner chamber surface 35 of housing 3. As shown best in FIGS. 2 and 4, pathway 31 then communicates with outlet port 7 of the gas flow indicator 1 through a plurality of peripheral openings 37 formed in cylinder head 17 to allow gas to pass therethrough. It will be appreciated, however, that other embodiments and configurations of cylinder 9 and piston 13 are conceivable within the scope of the present invention. For example, piston 13 could be configured with a moveable central plunger to allow passage of the flow of gas through the center of piston 13 upon movement of piston 13 within cylinder 9 to a position causing displacement of the plunger.

With reference to the embodiment shown in FIGS. 1 thru 5, it can be seen that the gas flow indicator 1 incorporates a first flow sensor 39 (e.g., electronic reed switch or Hall effect sensor) positioned adjacent outlet ports 29 of cylinder 9. Flow sensor 39 is activated or deactivated via switch-activating magnets 21 and 23 carried in piston 13 upon sensing a change of position of piston 13 within cylinder 9 caused by a change in the flow of gas therethrough. As shown in FIGS. 2 thru 5, in a preferred embodiment, sensor 39 is collocated on a transmitter printed circuit board 41 (PCB), which is attached to the outer housing 3 of the gas flow indicator 1. The electronics, comprising the transmitter PCB 41, battery 43 and a small loop antenna 45, are located under a plastic cover 47 affixed the housing 3 of gas flow indicator 1. Since it is deemed desirable that the actual transmitter circuit never needs battery replacement, the circuit has been designed with a single small lifetime battery 43. Battery 43 is expected to last up to 20 years, with normal usage, never requiring a change. Therefore, the entire transmitter electronics package may be potted, or filled with an epoxy like sealant, allowing for all weather operation.

Figure 2:
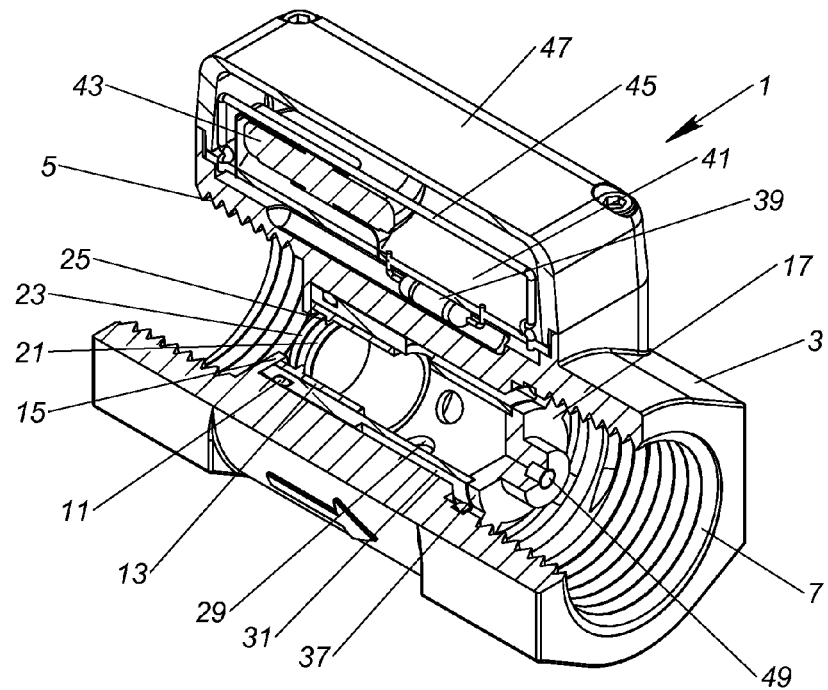
FIG. 2 is a perspective sectional view of the gas flow indicator in FIG. 1, with a cutaway section thereof removed to illustrate the configuration and operation of the gas flow indicator under no gas flow conditions.
Figure 3:
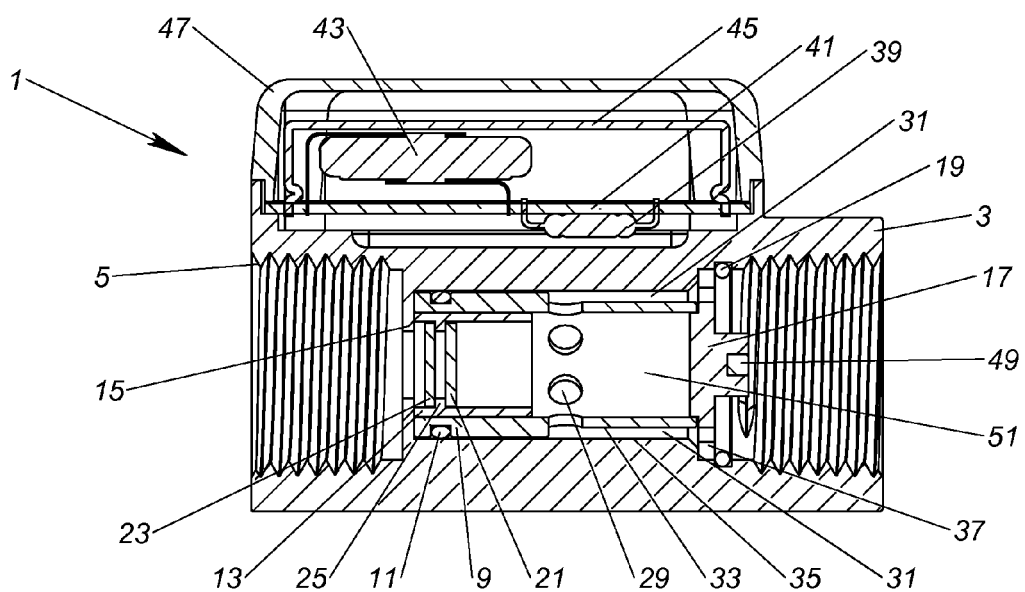
FIG. 3 is a vertical sectional view of the gas flow indicator in FIG. 1, also illustrating the configuration and operation of the gas flow indicator under no gas flow conditions.
Figure 4:
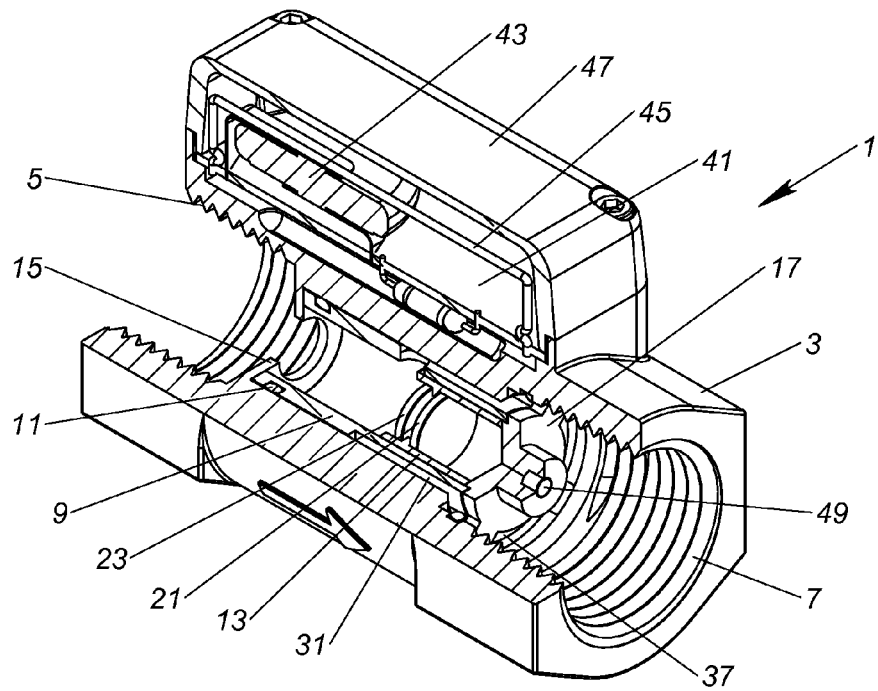
FIG. 4 is a perspective sectional view of the gas flow indicator in FIG. 1, with a cutaway section thereof removed to illustrate the configuration and operation of the gas flow indicator switch when gas is flowing.
Figure 5:
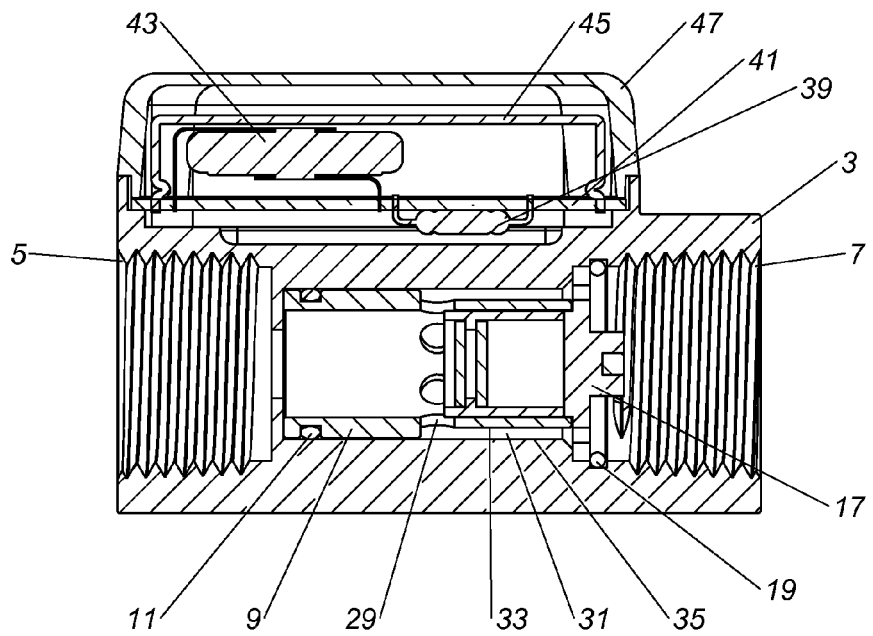
FIG. 5 is a vertical sectional view of the gas flow indicator in FIG. 1, also illustrating the configuration and operation of the gas flow indicator when gas is flowing.

In FIGS. 2 and 3, the gas flow indicator 1 is shown in a gas "OFF" state, with piston 13 disposed in its resting or "gas off" position against shoulder stop 15 at the input end of cylinder 9. In this position, no sustained gas is flowing through flow indicator 1 and the magnets 21 and 23 within the piston 13 are sufficiently far from the sensor 39 so that it is not activated. As shown in FIGS. 4 and 5, when the flow of gas is turned "ON" by one of the appliance control valves, a small differential pressure provides a sufficient lifting force to raise the piston 13 above the outlet ports 29, allowing gas to flow through outlet ports 29, into pathway 31 and out through port 7 to the grill. Upon opening of ports 29, piston 13 reaches a "gas on" position and sensor 39 is activated by magnets 21 and 23 carried in piston 13, thus triggering detection of the flow of gas and activating the alarm timing mechanism for monitoring the duration of gas flow.

Figure 5A:
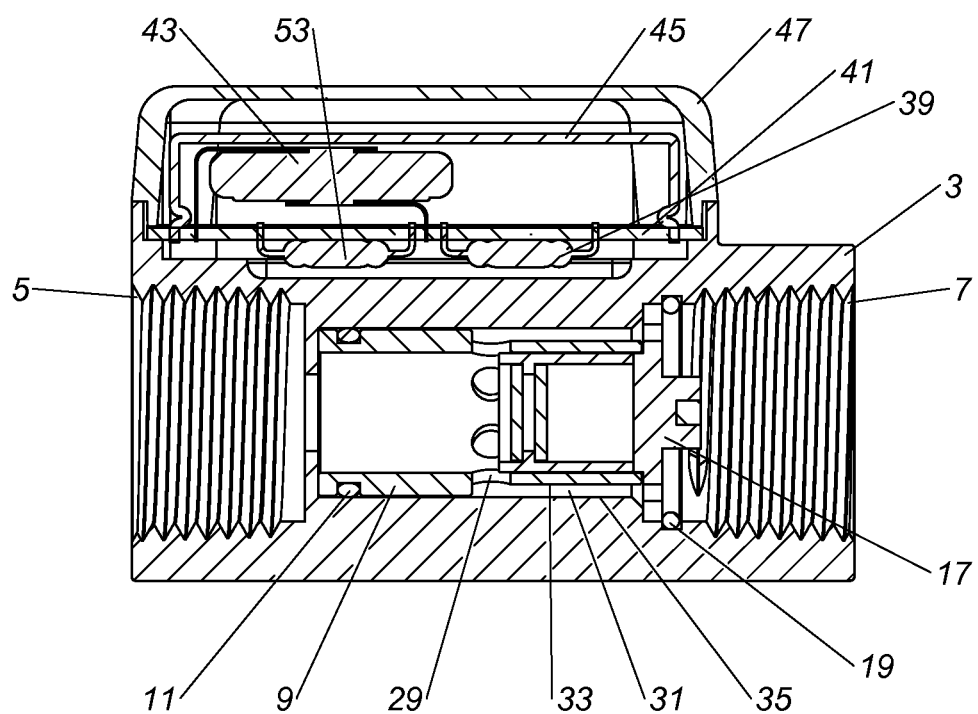
FIG. 5A is a vertical sectional view of an alternative embodiment of the gas flow indicator shown in FIG. 1, incorporating dual flow sensors for monitoring the gas flow characteristics and detecting "gas-out conditions of an appliance during operation.
Figure 6:
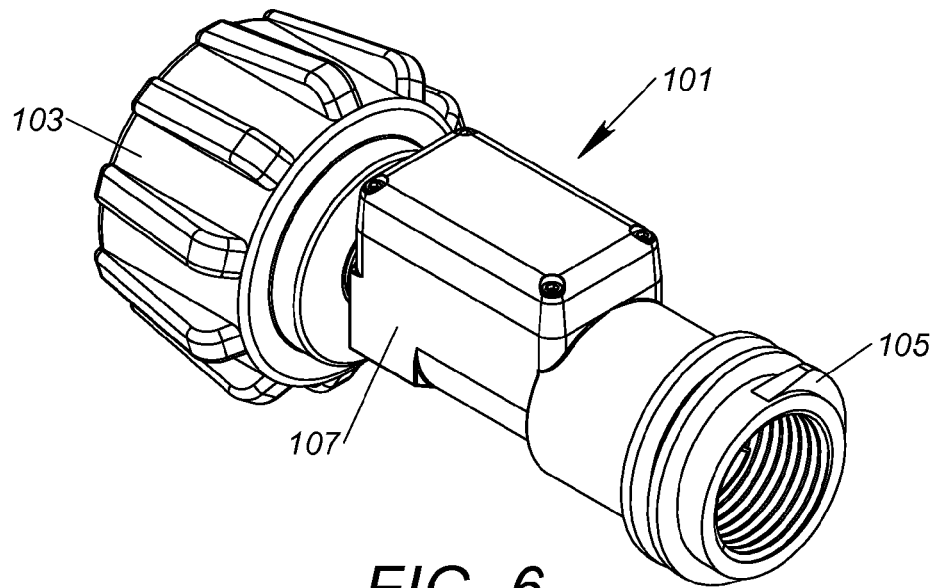
FIG. 6 is a perspective view of an alternative embodiment of a gas flow indicator configured for use in high pressure/low flow applications and incorporating a flow sensor capable of detecting and alerting of "gas-on" conditions of an appliance.

In an alternative embodiment shown in FIG. 5A, an additional flow sensor 53 (e.g., electronic reed switch or Hall effect sensor) may be incorporated in flow indicator 1 for purposes of monitoring and detecting potential "gas-out" conditions of an appliance during operation. This additional sensor is mounted adjacent shoulder 15 at the input end of cylinder 9, near the resting or "gas off" position of piston 13. Similar to sensor 39, sensor 53 is collocated on transmitter printed circuit board 41 (PCB), which is attached to the outer housing 3 of the gas flow indicator 1. As with sensor 39, this second sensor 53 is also activated or deactivated via switch-activating magnets 21 and 23 carried in piston 13 upon sensing a change of position of piston 13 within cylinder 9 caused by a change in the flow of gas therethrough.

Thus, when the gas flow through flow indicator 1 ceases for any reason and piston 13 moves to its resting position within cylinder 9, magnets 21 and 23 carried in piston 13 will cause sensor 53 to be activated. Conversely, as gas begins to flow and piston 13 moves away from its resting position, sensor 53 is deactivated. As is described in more detail hereafter, by using two sensors to detect both "gas off" and "gas on" conditions, one can monitor and detect for "gas-out" conditions (i.e., an appliance running out of gas during operation) automatically, without the need to manually activate or re-set a separate monitoring system. With the gas supply on and the appliance control valve(s) (i.e., valves at the appliance) open, gas begins to flow and the "gas-out" monitoring system activates automatically.

In use, the gas pressure on the downstream side of piston 13 will drop as the appliance control valve(s) is/are opened to atmospheric pressure. Since the gas pressure on the supply side is greater than atmospheric pressure, a pressure differential forms across piston 13. This causes piston 13 to move from its "gas off" position to its "gas on" position, where outlet ports 29 are opened, allowing gas to flow. With this, the magnets 21 and 23 within piston 13 will activate the "on" sensor 39, and provided the appliance control valve(s) remain open, gas will continue to flow and the pressure differential will hold piston 13 in its "gas on" position.

When the appliance control valve(s) is/are closed to turn the appliance off, the downstream flow ceases and pressure begins to build and equalize on both sides of piston 13, thereby initiating return of piston 13 to its resting or "gas off" position. Once piston 13 returns far enough to close outlet ports 29, sensor 39 deactivates and any residual gas within the flow indicator 1 bleeds off around piston 13 until both sides of piston 13 equalize at the supply pressure. At this point, piston 13 comes to rest in its "gas off" position, thus activating the "off" sensor 53. Upon closing the appliance control valve(s) and turning the appliance off, pressure equalizes and piston 13 returns to its "gas off" position generally within about one to two seconds.

When an appliance runs out of gas during operation, however, the gas flow characteristics are different. In this case, the supply pressure drops, reducing the pressure differential until the piston 13 begins to return. Piston 13 soon closes the outlet ports 29 and deactivates sensor 39, but at this point there is still sufficient pressure from the gas supply (e.g., fuel tank—not shown) to hold the piston 13 in the intermediate zone between its "gas on" position and its "gas off" position. Here again, since the outlet ports 29 are blocked, the flame is extinguished and the remaining gas from the supply is forced to vent slowly to atmospheric around the piston 13 and through the appliance control valves which are still open. In this case, the piston 13 cannot quickly return to the "gas off" position as it does when the appliance is intentionally turned off. The piston 13 will stay in this intermediate zone until the pressure equalizes on opposite sides of piston 13, at which time piston 13 will return to its "gas off" position. Upon the tank running to empty and the gas flow dropping so low as to cause the flame to extinguish, it generally takes about seven to ten seconds, or more, for piston 13 to fully return to its "gas off" position.

It is this time difference for the return of the piston 13 that makes the "gas-out" condition detectable. This difference can be readily measured by incorporating the additional sensor 53 at the "gas off" position, as shown in FIG. 5A. The position of the piston 13 can then be detected at three (3) locations, i.e., "gas off", "gas on", and if both sensors are deactivated, somewhere in between (i.e., the "intermediate zone"). If the return time of the piston 13 from the "gas on" position to the "gas off" position (i.e., the time from deactivation of sensor 39 to activation of sensor 53) is less than a predetermined threshold, the appliance was intentionally turned off. If the return time for the piston 13 is equal to or longer than this threshold, then the tank has run empty and a "gas-out" condition has been detected. Thus, by only observing gas flow characteristics, without the use of pressure or tank level sensors, an empty tank or gas-out condition can be reliably detected and an alarm can be activated to notify the user.

On occasion, some users may choose to turn the appliance off by first turning off the supply of gas at the source (i.e., supply tank valve) and then turning off the appliance control valve(s). This approach can still detect the difference between an appliance being intentionally shut off at the source and a "gas-out" condition where the tank runs to empty. However, in this case, the pressure on both sides of the piston 13 equalize to atmospheric since the appliance control valve(s) are still open. The differential pressure again equalizes and the piston 13 quickly returns (about 1-2 seconds) to the "gas off" or resting position.

In either of the above embodiments, even the lightest weight piston 13 will decrease the available gas pressure to the grill, causing performance of the grill to suffer. In order to effectively reduce the weight of the piston 13 and counter the force of gravity, an attractive biasing member or magnet 49 is embedded in the cylinder head 17 positioned at the upper end of the cylinder 9. This biasing magnet 49 attracts magnets 21 and 23 carried within the piston 13, thereby helping to attract piston 13 toward its switch-activating position and effectively reduce the pressure necessary to support it above the outlet ports 29.

The attractive biasing magnet 49 acts as a non-linear spring, providing an increasing force of attraction as the piston gets closer, acting inversely to any mechanical spring. This is an ideal solution to reducing the effective weight of piston 13, as it only acts on the piston 13 after it has been raised, allowing it to fully return to its rest position. The biasing magnet 49 is sized appropriately so that it is not capable of supporting the weight of the piston 13 without the addition of some differential pressure. Therefore, when the gas flow is turned off, the differential pressure equalizes, and the piston 13 returns to its resting or "gas off" position by the force of gravity. Achieving this effect mechanically would introduce friction and hysteresis, negatively affecting the performance of the sensor. This approach provides a nearly frictionless lifting force, as the piston can freely fall with very little drag from the cylinder sidewalls.

FIGS. 6 thru 10 of the drawings illustrate another alternative embodiment of a gas flow indicator 101 which is designed for connection between a typical gas grill propane tank and the existing low pressure regulator, where gas pressure is high but the rate of gas flow is even lower. In this embodiment, the integrated gas flow indicator is fitted with an ACME/QCC-1 (CGA791) female input connector 103 and a similar male output connector 105 for quick and easy installation by the grill owner. In the preferred embodiment, it is contemplated that the connector 103 will be connected directly to the propane tank. Therefore, in this embodiment, flow indicator 101 will likely be horizontally oriented, versus the vertical installation of gas flow indicator 1 on the low pressure side of the pressure regulator.

As seen best in FIGS. 7 thru 10, the main housing body 107 of gas flow indicator 101 and the tank connector 103 are cooperatively threaded to facilitate a sealed threadable engagement therebetween. The opposite or outlet end of housing 107 is integrally formed as a male QCC-1 coupler 105 with a typical internal safety gas valve 109 contained therewithin, similar to that of a standard propane tank. With the ability to connect the gas flow indicator 101 directly inline to a standard propane tank, it is evident that this configuration is particularly well-suited for use as an aftermarket add-on product.

The gas flow indicator 101 shown in FIGS. 7 thru 10 is generally constructed and functions in a manner similar to gas flow indicator 1 of the previous embodiment shown in FIGS. 1 thru 5. As shown in FIGS. 7 thru 10, gas flow indicator 101 similarly includes an inner cylinder 111, piston 113 with switch-activation magnets 115 and 117, and an electronic module comprising a sensor (e.g., electronic reed switch or Hall effect sensor) 119, transmitter PCB 121, battery 123 and antenna 125 contained by cover 127.

Figure 9:
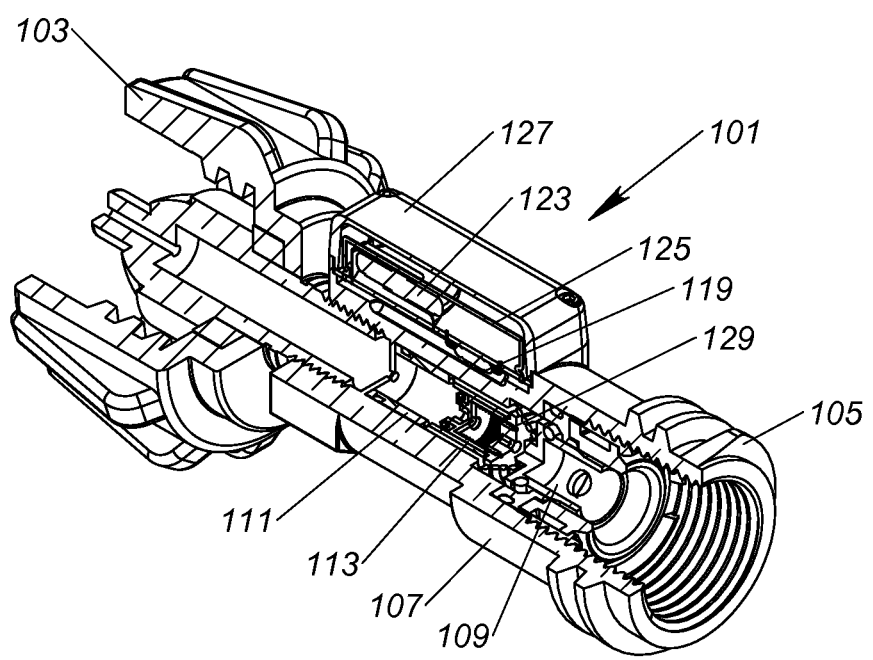
FIG. 9 is a perspective sectional view of the gas flow indicator in FIG. 6, with a cutaway section thereof removed to illustrate the configuration and operation of the gas flow indicator when gas is flowing.
Figure 10:
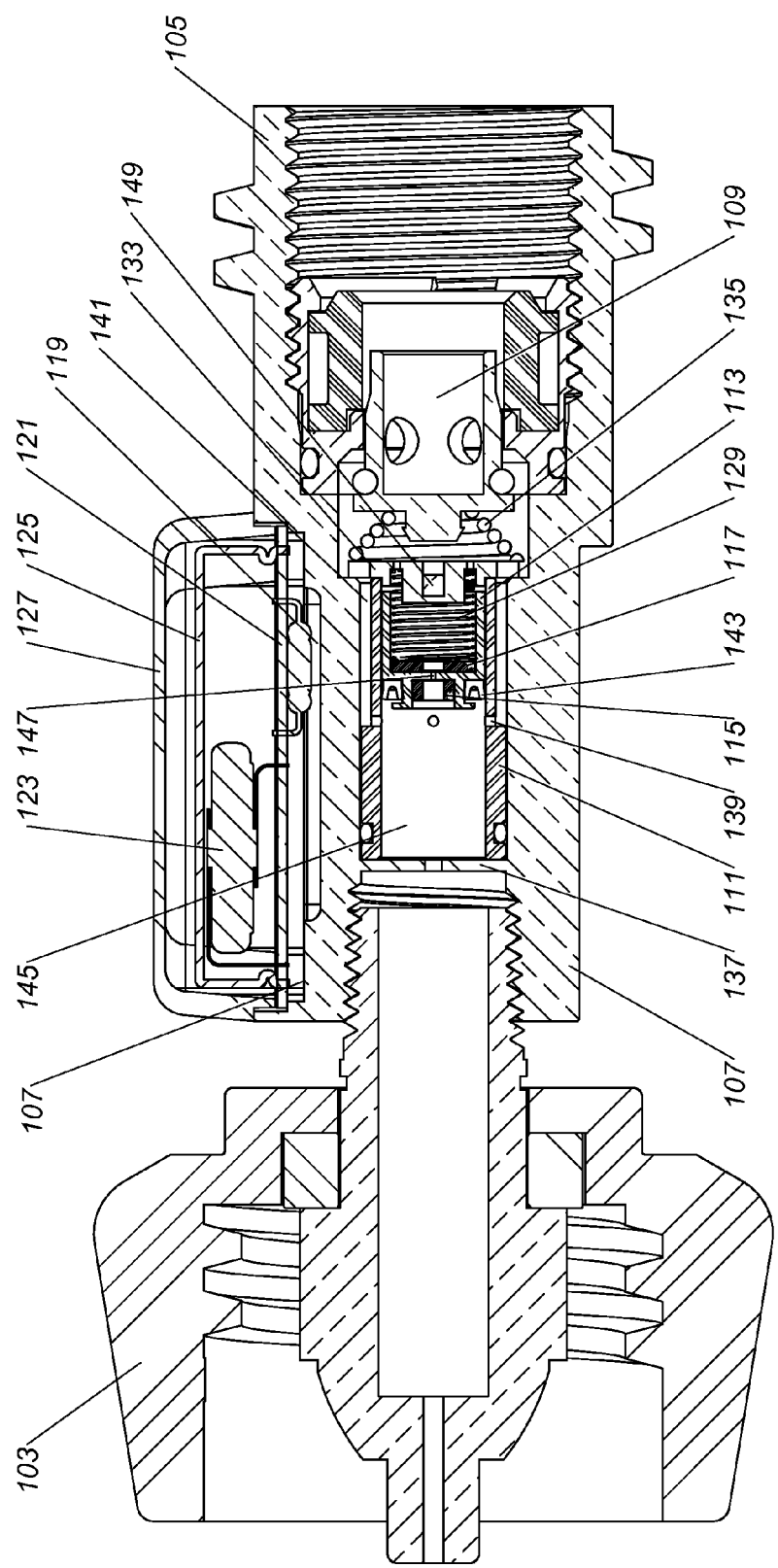
FIG. 10 is a vertical sectional view of the gas flow indicator in FIG. 6, also illustrating the configuration and operation of the gas flow indicator when gas is flowing.

However, detection of the flow of gas on the high pressure side of the regulator presents an additional problem. The flow of gas is so low that, unless the piston is sealed against the piston cylinder wall, the gas will leak around the piston without any appreciable force being applied thereto. Therefore, in order to prevent such gas blow-by, the piston 113 is configured to carry an outer annular seal 143 which seals the piston 113 against the wall of the inner cylinder 111, yet allows the piston 113 to move readily between its resting or "gas off" position (FIGS. 7 and 8) and its switch-activating position (FIGS. 9 and 10).

In the absence of gas flowing, piston 113 must return to its resting position. In order for this to occur, any residual gas contained in the forward end 145 of cylinder 111 must be allowed to slowly escape. However, since piston 113 is sealed relative to cylinder 111, such residual gas cannot dissipate around the piston and will thus restrict the return of piston 113 unless some means of escape is provided. To accomplish this, piston 113 is provided with a vent hole 147 which extends axially through the middle thereof, thus allowing any residual gas in the forward end 145 of cylinder 111 to seep through to the other side of piston 113 upon a stoppage of gas flow. While tolerance requirements between piston 113 and cylinder 111 make it difficult to prevent gas blow-by without seal 143, it has been found that the use of such a sealed piston configuration 113 with a vent hole 147 can adequately provide the desired response characteristics for the detection of gas flow on the high pressure side of the regulator.

Since gas flow indicator 101 is configured for installation in the horizontal position, gravity will not aid in returning the piston 113 to its original resting or "gas off" position upon a stoppage of gas flow. Therefore, a very weak spring 129 is carried within cylinder 111 and used to provide force against piston 113 for the return to its resting position at the inlet end of cylinder 111 when the flow of gas is cut off. The spring and vent are adjusted in combination to ensure piston travel at the lowest possible gas flow, i.e. that of a single burner at its lowest setting, while still allowing for the piston to fully return to its gas off position in the absence of gas flow. The spring needs to be strong enough to overcome the additional friction of the seal, while the hole needs to be small enough to allow sufficient gas pressure to build within the cylinder to move the piston, thereby activating the sensor 119 at the lowest possible flow rate without bypassing through the vent itself. In this case, a biasing magnet 149, similar to the biasing magnet 49 utilized in gas flow indicator 1 of the previous embodiment, can be used to offset and linearize the force of the spring, thus reducing the differential pressure necessary to activate the switch. This is beneficial, as at higher pressures the flow rate is significantly reduced, making it difficult to generate sufficient pressure to overcome the spring force and activate the switch.

To accommodate spring 129, piston 113 is constructed such that piston 113 defines a chamber 131 facing cylinder head 133 and the outlet of gas flow indicator 101. As shown, spring 129 seats within chamber 131 and is retained thereby. The opposite end of spring 129 seats against biasing magnet 149 within the cylinder head 133 covering the outlet of inner cylinder 111, which is retained by retaining spring 135.

Figure 7:
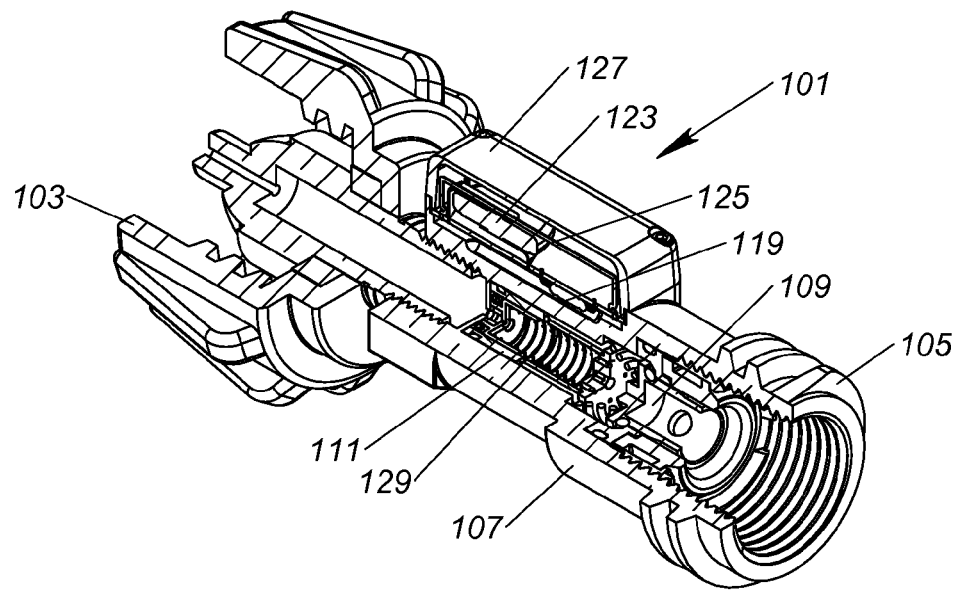
FIG. 7 is a perspective sectional view of the gas flow indicator in FIG. 6, with a cutaway section thereof removed to illustrate the configuration and operation of the gas flow indicator under no gas flow conditions.
Figure 8:
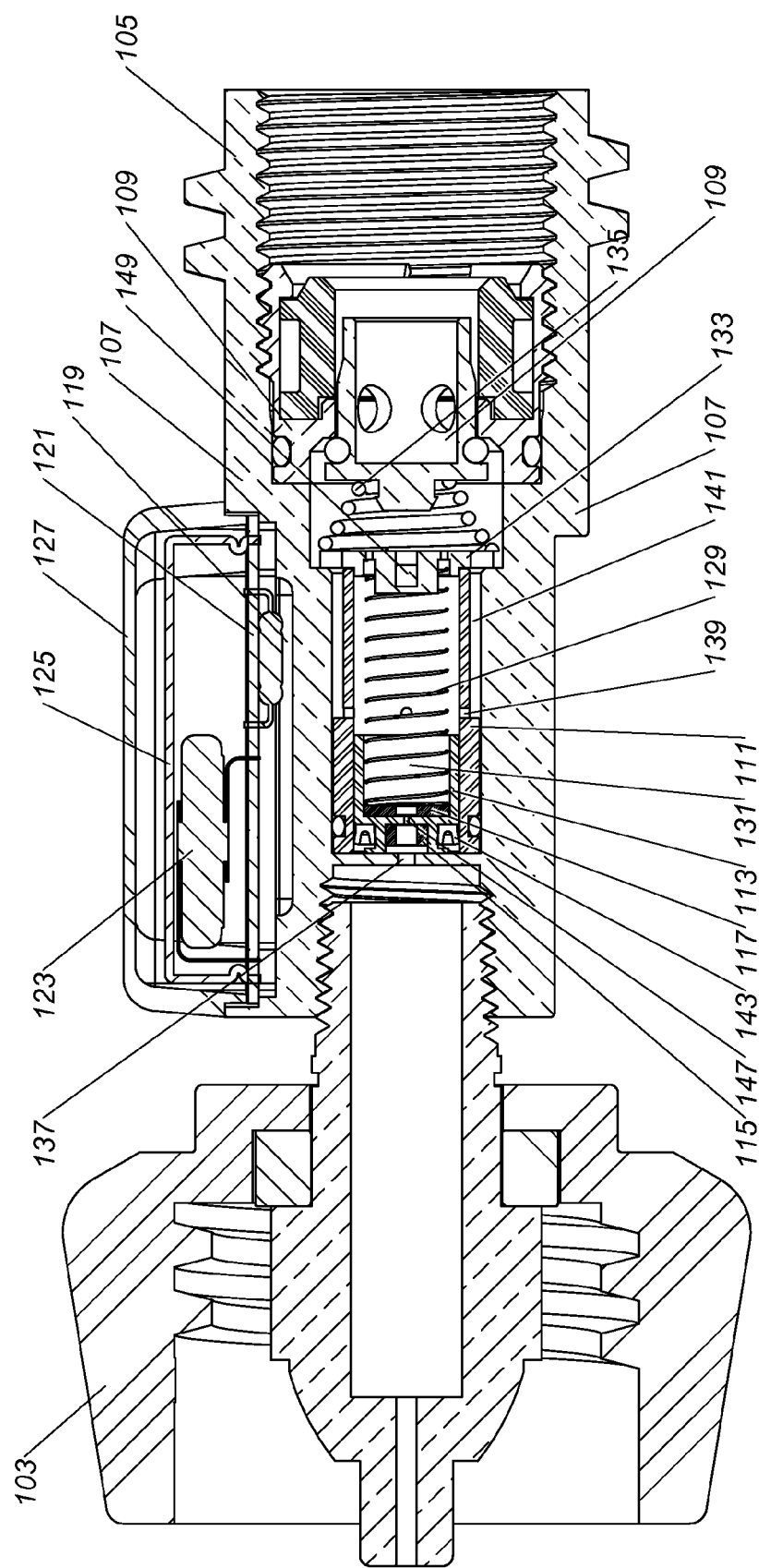
FIG. 8 is a vertical sectional view of the gas flow indicator as shown in FIG. 6, also illustrating the configuration and operation of the gas flow indicator under no gas flow conditions.

With reference to FIGS. 7 and 8, the gas flow indicator 101 is shown in a gas "OFF" state, with piston 113 being held in place by spring 129 at its resting or "gas off" position against shoulder stop 137 at the input end of cylinder 111. In this position, no gas flows through flow indicator 101 and the magnets 115 and 117 within the piston 113 are sufficiently far from the sensor 119 so that it is not activated. As shown in FIGS. 9 and 10, however, when the flow of gas is turned "ON" by one of the appliance control valves, a small differential pressure provides a sufficient force to move the sealed piston 113 past the outlet ports 139, allowing gas to flow into pathway 141, through safety valve 109 and out of the gas flow indicator 101 to the grill. Upon opening of ports 139, piston 113 reaches a "gas on" position and sensor 119 is activated, thus triggering detection of the flow of gas and activating the alarm timing mechanism for monitoring the duration of gas flow.

When the gas flow is turned off, the differential pressure equalizes, and spring 129 exerts a force against piston 113 to return it to its resting or "gas off" position. Any residual gas retained in the forward end 145 of the piston cylinder 111 will bleed off and escape through vent hole 147 in piston 113, thus allowing piston 113 to return to its resting position.

Figure 10A:
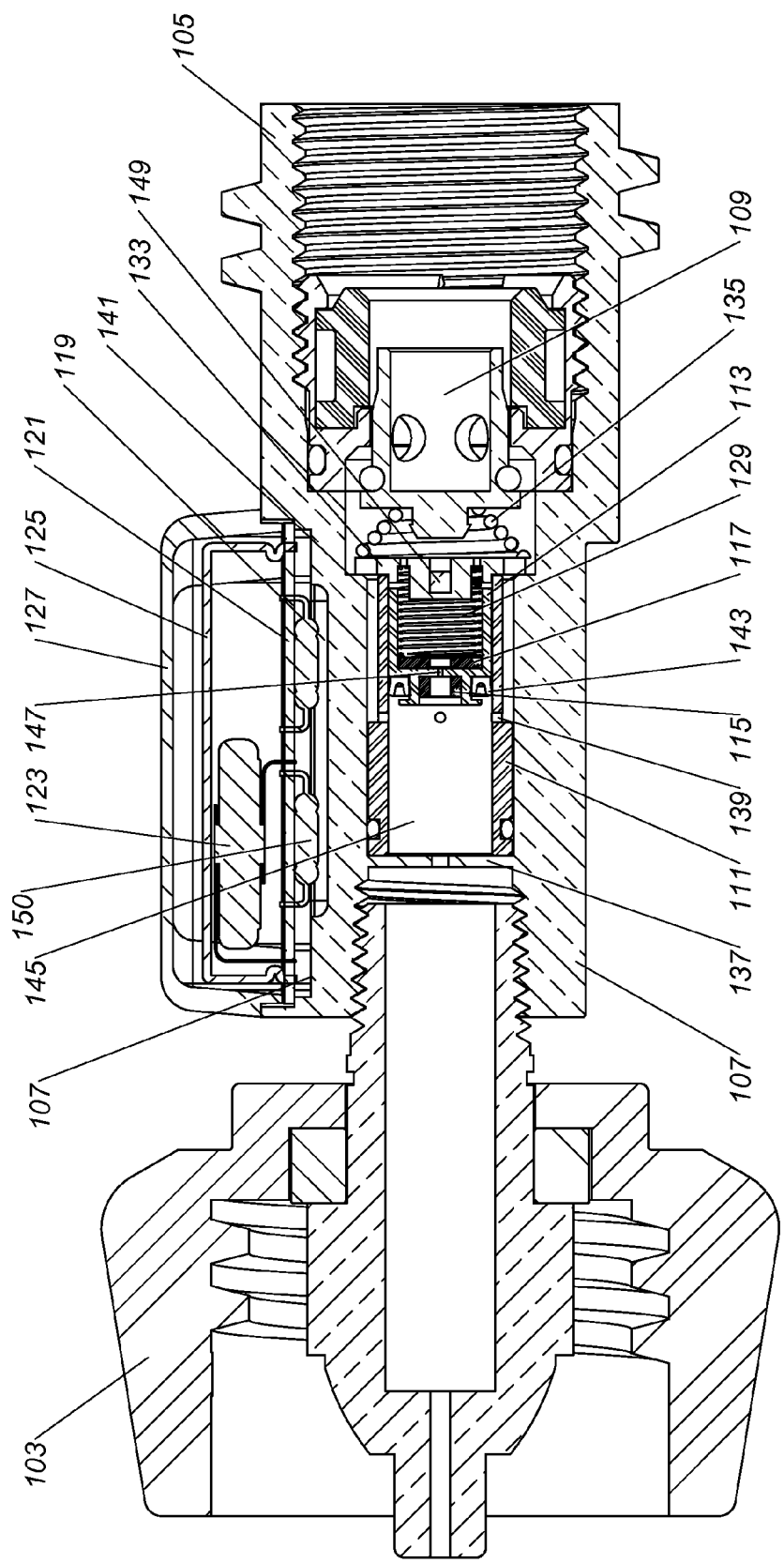
FIG. 10A is a vertical sectional view of an alternative embodiment of the gas flow indicator shown in FIG. 6, incorporating dual flow sensors for monitoring the gas flow characteristics and detecting "gas-out conditions of an appliance during operation.

As in the previous embodiment of gas flow indicator 1, gas flow indicator 101 may also be modified to incorporate an automatic monitoring system for detecting "gas-out" conditions of an appliance during operation. As shown in FIG. 10A, an additional sensor 150 (e.g., electronic reed switch or Hall effect sensor) may similarly be mounted in flow indicator 101 adjacent shoulder stop 137 at the input end of cylinder 111, near the resting or "gas off" position of piston 113. Similar to sensor 119, sensor 150 is collocated on transmitter printed circuit board 121 (PCB), which is attached to the outer housing 127 of the gas flow indicator 101.

In the same manner as with flow indicator 1, by monitoring the time required for piston 113 to return from its "gas on" position to its "gas off" position within cylinder 111, a "gas-out" condition (i.e., gas supply runs out during use) may be readily detected. When the flow of gas through flow indicator 101 ceases, spring 129 will move piston 113 to its resting position against stop 137, where magnets 115 and 117 carried in piston 113 will activate sensor 150. With flow indicator 101, however, piston 113 is sealed relative to the piston cylinder 111, so as piston 113 returns to its "gas off" position and closes outlet ports 139, any remaining gas in flow indicator 101 must bleed off through the piston vent hole 147, rather than around the piston 113.

If the appliance is intentionally turned off via the appliance controls valve(s), the pressure on both sides of piston 113 will quickly equalize at the supply pressure, allowing the piston to return to its "gas off" position and activate sensor 150. In this case, the return time for piston 113 to come to rest at its "gas off" position is generally about one to two seconds. If, on the other hand, the appliance runs out of gas during operation, the supply pressure drops, causing piston 113 to gradually return until outlet ports 139 are closed and sensor 119 is deactivated. However, piston 113 cannot return to its "gas off" position and activate sensor 150 until the remaining supply of gas filters through the vent hole 147 and out through the open appliance control valve(s). Consequently, in this case, it generally takes about seven to ten seconds, or more, for piston 113 to fully return to its resting or "gas off" position and activate sensor 150.

Once again, it is this time difference for the return of the piston 113 that makes the "gas-out" condition detectable. If the return time of the piston 113 from the "gas on" position to the "gas off" position (i.e., the time from deactivation of sensor 119 to activation of sensor 150) is less than a predetermined threshold, the appliance was intentionally turned off. If the return time for the piston 113 is equal to or longer than this threshold, then the tank has run empty and a "gas-out" condition has been detected. Thus, by only observing gas flow characteristics, without the use of pressure or tank level sensors, an empty tank or "gas-out" condition can be reliably detected and an alarm can be activated to notify the user.

In either of the above low pressure/low flow or high pressure/low flow embodiments, the gas flow indicator (1, 101) is designed to function in applications involving extremely low rates of gas flow, and is therefore quite sensitive to any change in gas pressure. Under such circumstances, and particularly in low pressure/low flow applications, conventional gas flow indicators commonly experience piston oscillation caused by sudden variances in gas pressure. In the present invention, however, each embodiment of the gas flow indicator (1, 101) is designed with a dashpot dampening mechanism to alleviate any such piston oscillation.

In both embodiments, the attractive biasing magnet (49, 149), along with the semi-sealing cylinder head (17,133) at the end of the internal cylinder (9,111) helps to dampen piston oscillations by way of providing stabilizing forces. The coaxial nature of the inner cylinder (9,111) concentric within the primary outer chamber of the housing (3,107) allows for a semi-sealed chamber (51,131) (see, FIGS. 3, 8) beyond the piston (13,113) forming a dashpot damper. This, in conjunction with the attractive magnet (49,149), completely eliminates oscillations of the piston (13,113).

As noted previously, in either embodiment, integrated with the gas flow indicator (1, 101) is an alarm timing mechanism. This alarm timing mechanism may incorporate an automatic alarm timer and alarm, or in the preferred embodiment, a wireless transmitter for remote activation thereof. With the enhanced "gas-out" detection feature of FIG. 5A or 10A, a similar alarm mechanism may be employed to alert the user of a "gas-out" condition during use. In both configurations, the gas flow indicator, circuit board, power supply, and housings are all integrated. This provides for easy installation. In the high pressure approach, the integrated flow indicator 101 is fitted with ACME/QCC-1 (CGA791) input and output connections 103 and 105 for quick and easy installation by the grill owner between a typical gas grill propane tank and the existing low pressure regulator. For factory installed applications (Original Equipment Manufacturer—OEM), or for use with household natural gas, connection to the low pressure side using gas flow indicator 1 is preferred. The integrated housing of flow indicator 1 is quite small, allowing direct inline installation in the gas line using standard tapered or flare fitting connections.

Figure 11A:
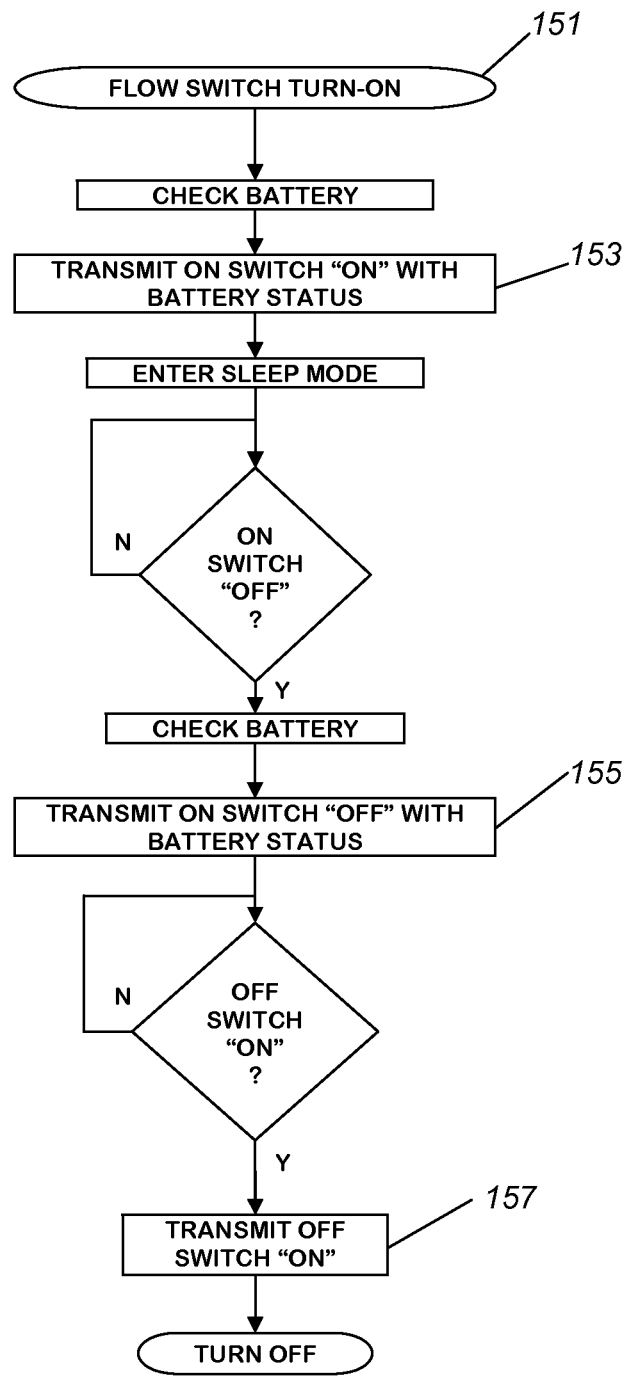
FIGS. 11A, 11B and 11C depict an integrated flow chart system illustrating the operation of a gas flow analyzer and alarm timing mechanism which incorporates a gas flow indicator embodying the principles of my invention.
Figure 11B:
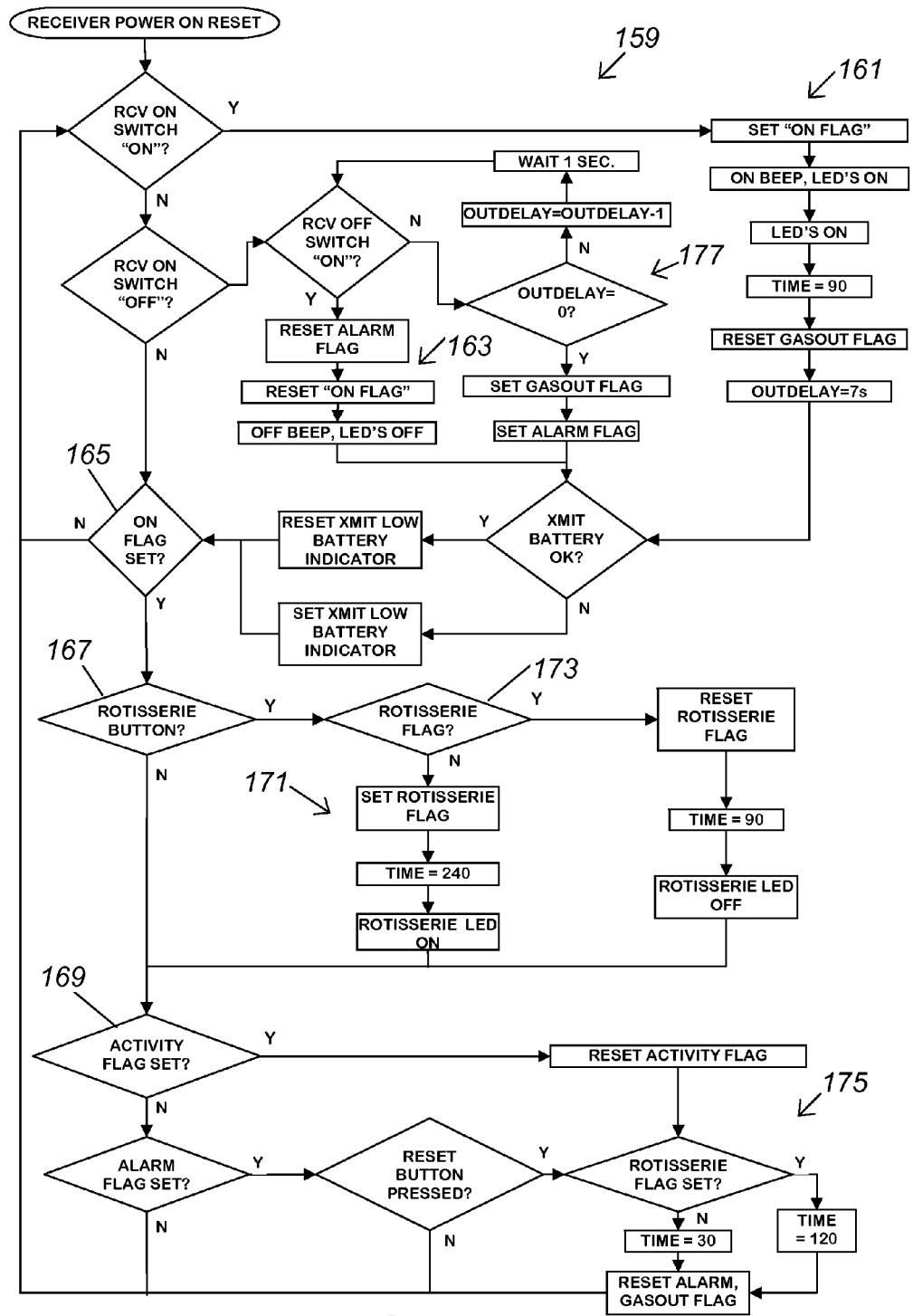
Figure 11C:
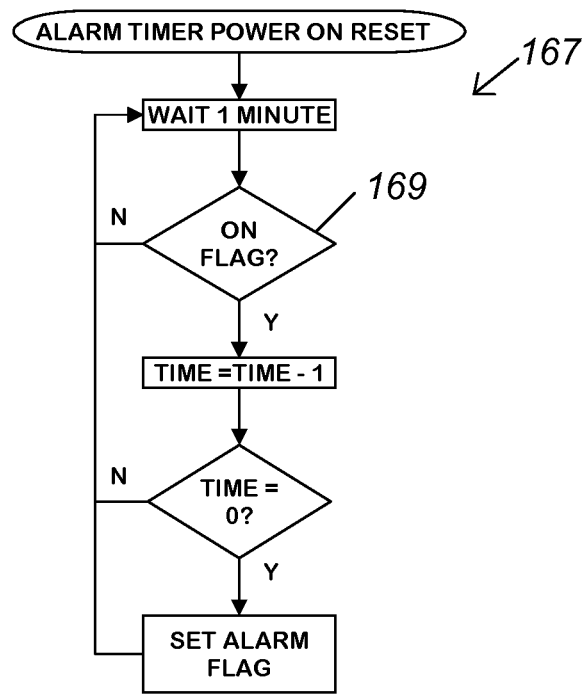

With reference to the flow charts shown in FIGS. 11A, 11B and 11C, operation of the integrated gas flow analyzer and alarm timing mechanism can be illustrated and explained. As denoted at step 151 in FIG. 11A, when gas flows, the transmitter circuitry of flow indicator (1, 101) automatically turns on and the switch-activating magnets (21, 23; 115, 117) actuate the "on" sensor (39, 119), thereby activating the transmitter PCB (41, 121). The circuit is completely off before this point, conserving battery power. The status of the battery (43, 123) is combined with the "GAS-ON" indication and transmitted to the receiver (step 153).

The transmitter then enters a power saving sleep mode and the system monitors sensor (39, 119) for a deactivation signal indicating that gas flow has begun to diminish on account of an intentional stoppage or gas-out condition during operation. When this occurs, the status of the battery (43, 123) is again checked and a signal indicating deactivation of sensor (39, 119) is transmitted to the receiver (step 155).

With sensor (39, 119) deactivated, the transmitter circuitry begins monitoring the status of the "off" sensor (53, 150) to determine when such sensor is activated, thus indicating gas supply exhaustion or a stoppage in flow. Once this occurs, a signal indicating activation of sensor (53, 150) is transmitted to the receiver (step 157), and the transmitter circuit powers down.

In a preferred embodiment, when the flow of gas is detected, the transmitter wirelessly sends a "GAS-ON" signal (i.e., sensor (39, 119) is activated) to the receiver of the alarm timing mechanism, which may be mounted on the grill itself, at some other remote location, or both. As seen in FIG. 11B, the receiver circuit, after a power-on reset, runs in a continuous loop 159 that constantly listens for and analyzes valid signals received from the transmitter. Upon reception of a "GAS-ON" signal, the receiver circuit sets the ON-FLAG, which is used to start the timer, sounds the ON beep and LED, and sets the initial "gas-on" timer to around 90 minutes. It also sets the threshold "gas-out" delay timer (e.g., 7-10 seconds) for monitoring for possible "gas-out" conditions during operation. (step 161). Of course, either of these times may be adjusted as desired or needed.

If the receiver circuit receives a valid signal that the "on" sensor (39, 119) has been deactivated, it begins the "gas-out" countdown delay and waits for receipt of a valid signal indicating the "off" sensor (53, 150) has been activated (Step 177). If sensor (53, 150) is activated before the "gas-out" timing threshold is reached (i.e., Step 177, OUTDELAY=0), the receiver circuit determines the gas supply was intentionally shut off and resets the ON-FLAG, sounds the OFF beep and turns off the LED; it also resets the alarm in case it was previously on (step 163). If, on the other hand, sensor (53, 150) fails to activate until after the timing threshold is reached, this signifies a "gas-out" condition during operation of the appliance and the receiver circuit sets the GASOUT FLAG and ALARM FLAG, thus sounding an alarm to notify the user of the "gas-out" condition. In either case, the transmitter battery is checked and the status displayed with an additional LED.

In the event setting of the ON-FLAG is confirmed (step 165), with each pass through the loop 159, accessory buttons 167 (i.e., rotisserie) and an optional activity sensor 169 are checked. If the rotisserie button is pressed, the receiver/timer enters a ROTISSERIE mode, where a rotisserie LED is lit and the timer is set to a much longer time, such as 4 hours (step 171). If the rotisserie button is subsequently pressed, the ROTISSERIE FLAG 173 provides toggling between modes; when deactivated, the ROTISSERIE LED is turned off, and the timer returns to the usual 90 minute setting.

If the optional activity sensor is used, this automatically resets the remaining time to shorter intervals, i.e., 30 minutes for the normal mode, and 120 for the rotisserie mode (step 175), and the countdown begins again. If the alarm has been activated, then pressing the reset button manually resets the alarm timer to 30 or 120 minutes depending on the mode. If the receiver is mounted on the grill handle, user activity can be detected in the form of a tilt switch which senses the cover has been opened or closed. Certain conventional grills already employ such grill handle activity sensors to turn on a cooking light, and could easily be adapted to incorporate such a receiver. A remotely placed receiver, such as in a residential kitchen, does not employ an activity sensor and simply begins counting down after the "GAS-ON" signal is received. In this case, the handle mounted receiver can optionally contain an additional transmitter to signal other remote receivers of grill activity so that they can also reset their timers.

As shown in FIG. 11C, the alarm timer routine 167 runs independently of the receiver routine and activates the alarm after the time has decremented to zero. The ON FLAG 169 prevents the alarm from being activated when the grill is off. When the ALARM FLAG is set by the alarm timer for any reason, the hardware sounds the alarm.

In the event gas flow through indicator (1, 101) to the appliance continues beyond the established "gas-on" time limit set in Step 161 above, and no signal is received from the transmitter indicating the "on" sensor (39, 119) has become deactivated, it is assumed that the operating grill has been forgotten, and the alarm timer circuit of FIG. 11C will set the ALARM FLAG, thus sounding a reminder alarm. The receiver is fitted with a push button to disable the alarm, and reset the timer to another predetermined time, 30 minutes for example. If the receiver still has not received a signal indicating deactivation of the "on" sensor (39, 119) after this new period of time, the grill alarm sounds again. This will happen indefinitely until the grill is turned off.

Each receiver is powered by easily replaceable AA type batteries, or configured with a typical AC plug. The operating range of the transmitter/receiver combination is approximately 100 feet. As noted previously, included with each and every transmission, is the battery status. In the unlikely event the grill should ever out last the transmitter battery (43, 123), a low battery status alarm will be activated in the receiver/alarm, indicating it is time to replace the transmitter unit. Since the receiver/timer units need to always be "listening" for a GAS-ON signal, they consume more power than the transmitters, and have therefore been designed with easily replaceable batteries or a direct AC power connection.

When used with the activity sensor, to avoid a possible explosion, if the flow of gas is first detected while the grill cover is closed, the system will sound the alarm until either the flow of gas is turned off or the cover is opened. This is not possible with other means of operation detection, such as temperature or flame detection, where the response is too late. This feature can also be integrated with the grill ignition system to actually prevent the ignition spark from occurring while the cover is closed, rather than just sounding an alarm.

Obviously, in such case, it is highly desirable for the flow indicator (1, 101) to have a fast response when alerting the user that the cover is closed while attempting to ignite the grill. Therefore, it is contemplated that the dashpot performance of the gas flow indicator may be easily adjusted to improve switch performance by incorporating a small vent hole or grooves (not shown) in the respective cylinder head (17, 133) of the flow indicator (1, 101), so that a minimum of damping occurs, thus allowing for a faster response.

The gas flow indicator (1, 101) of either embodiment is fabricated from gas safe components. The outer housing (3, 107) is preferably fabricated from brass, and the electronics module cover (47, 127) of plastic. The piston (13, 113) and inner cylinder (9, 111), on the other hand, are ideally constructed of aluminum. This ensures that the piston will be as light weight as possible, and that sizing tolerances between the piston and inner cylinder will remain consistent during thermal expansion and contraction. Thus, even though the piston and cylinder are close fitting, operation across the temperature of interest will not be affected.

In the preferred embodiment, the gas flow indicator (1, 101) is complete with a small wireless transmitter and power supply. The transmitter is ideally in the 433 MHz region, where operation is allowed by the FCC and frequencies are low enough to pass through walls of ordinary construction, necessary if the transmitter is located out of doors with the grill, and the receiver is perhaps located indoors. The 915 MHz region could also be considered. It would provide for smaller antennas, but the indoor/outdoor transmission may suffer.

It is possible that modern grill configurations could potentially cause transmission problems. The lower pedestal of a modern gas grill is frequently configured as a cabinet, providing a location to "hide" the propane tank and keep it from view. These are typically constructed of metal, and can be problematic for the transmitter if located at the tank as in the high pressure application, or connected near the manifold as in the low pressure application. The metal cabinet forms a shield, effectively blocking radio transmissions from the transmitter antenna to the receiver.

To overcome this, rather than use a typical antenna, connection can be made directly to the brass housing (3, 107) of the gas flow indicator (1, 101). Thus, when connected to the propane tank, as in the high pressure application, the tank becomes a highly effective antenna, coupling to other metal structure that it is in contact with, and radiating beyond the cabinet. In the low pressure application, when connected to the metal gas line near the valves and manifold, the entire upper structure of the grill becomes the radiating element. In each case, the problem of the closed cabinet is eliminated.

When the above items are combined, the present invention provides a safe and effective means to detect gas-out conditions during operation and prevent accidental sustained operation of a gas appliance in the event the operator forgets to turn the appliance off. It is highly effective, simple and easy to install, but still leaves the ultimate responsibility of turning off the appliance with the operator.

It will, of course, be understood that various changes may be made in the form, details, arrangement and proportions of the parts without departing from the scope of the invention which comprises the matter shown and described herein and set forth in the appended claims.

The invention claimed is:
1. An apparatus for detecting gas-out conditions of a gas-operated appliance during operation, comprising:
 (a) a piston carried within a piston cylinder and movable in response to the flow of gas through said piston cylinder between a first position and a second position, said first position and said second position being spaced from one another and defining an intermediate zone therebetween where said piston substantially restricts the flow of gas through said piston cylinder;
 (b) a first sensor operatively disposed for activation upon movement of said piston to said first position and deactivation upon movement of said piston away from said first position;
 (c) a second sensor operatively disposed for activation upon movement of said piston to said second position and deactivation upon movement of said piston away from said second position;
 (d) a gas flow analyzer operatively connected to said first sensor and said second sensor, said gas flow analyzer being configured to detect the difference between the gas-operated appliance running out of gas during operation and the gas to the gas-operated appliance being intentionally turned off by monitoring the time from deactivation of said first sensor to activation of said second sensor.

2. The detection apparatus of claim 1, wherein said first sensor is disposed adjacent an outlet port to said piston cylinder.

3. The detection apparatus of claim 2, wherein said second sensor is disposed adjacent an inlet port to said piston cylinder.

4. The detection apparatus of claim 1, wherein said first position of said piston within said piston cylinder represents a location where gas flow through said piston cylinder is substantially unrestricted and a said second position of said piston within said piston cylinder represents a location where no sustained gas flow through said piston cylinder is present.

5. The detection apparatus of claim 4, wherein said gas flow analyzer includes a predetermined timing threshold, such that a positive gas-out condition of the gas-operated appliance during operation is detected if the time from deactivation of said first sensor to activation of said second sensor exceeds said timing threshold.

6. The detection apparatus of claim 1, wherein said gas flow analyzer is configured to monitor the time for said piston to travel from said first position to said second position within said cylinder.

7. The detection apparatus of claim 1, including an alarm mechanism operatively connected to said gas flow analyzer for alerting to gas-out conditions of the gas appliance during operation thereof.

8. The detection apparatus of claim 1, including an alarm mechanism operatively connected to said gas flow analyzer for alerting to the presence of sustained gas flow through said piston cylinder after a predetermined period of time.

9. The detection apparatus of claim 1, wherein said first sensor and said second sensor are electronic switches which are activated by a magnet carried within said piston.

10. An apparatus for detecting gas-out conditions of a gas-operated appliance during operation, comprising:
   (a) a piston carried within a piston cylinder and movable in response to the flow of gas through said piston cylinder between a first position where gas flow through said piston cylinder is substantially unrestricted and a second position where no sustained gas flow through said piston cylinder is present;
   (b) a first sensor operatively disposed adjacent said first position within said piston cylinder for activation upon movement of said piston to said first position and deactivation upon movement of said piston away from said first position;
   (c) a second sensor operatively disposed adjacent said second position within said piston cylinder for activation upon movement of said piston to said second position and deactivation upon movement of said piston away from said second position;
   (d) a gas flow analyzer operatively connected to said first sensor and said second sensor for detecting the difference between the gas-operated appliance running out of gas during operation and the gas to the gas-operated appliance being intentionally turned off based on the timing for said piston to move from said first position to said second position within said piston cylinder.

11. The detection apparatus of claim 10, wherein said first and said second sensors are each comprised of a switch which is activated or deactivated based upon a change of position of said piston within said cylinder caused by a change in the flow of gas through said cylinder.

12. The detection apparatus of claim 10, wherein said first and said second sensors are each comprised of a magnetic reed switch which is activated by a magnet carried within said piston.

13. The detection apparatus of claim 10, wherein said gas flow analyzer is configured to monitor the time from deactivation of said first sensor to activation of said second sensor as gas flow through said cylinder is depleted.

14. The detection apparatus of claim 13, wherein said gas flow analyzer is configured to detect a positive gas-out condition of the gas-operated appliance during operation when the time from deactivation of said first sensor to activation of said second sensor exceeds a predetermined timing threshold.

15. The detection apparatus of claim 13, including an alarm mechanism operatively connected to said gas flow analyzer for alerting to gas-out conditions of the gas appliance during operation thereof.

16. A method for detecting gas-out conditions of a gas-operated appliance during operation, comprising the steps of:
   (a) providing a piston carried within a piston cylinder which is movable in response to the flow of gas through said piston cylinder between a first position where the flow of gas is substantially unrestricted and a second position where no sustained gas flow through said piston cylinder is present;
   (b) determining the time it takes for said piston to travel from said first position within said piston cylinder to said second position within said piston cylinder as the rate of gas flow through said piston cylinder diminishes;
   (c) comparing the time it takes for said piston to travel from said first position within said piston cylinder to said second position with a predetermined timing threshold value;
   (d) providing an alarm that the gas-operated appliance has run out of gas as opposed to being intentionally turned off if the travel time of said piston from said first position to said second position within said piston cylinder exceeds said predetermined timing threshold.

17. The method set forth in claim 16, wherein said step of determining the time it takes for said piston to travel from said first position within said piston cylinder to said second position within said cylinder includes sensing the position of said piston within said cylinder with a separate magnetic switch located adjacent each of said first and said second positions within said piston cylinder.

18. The method set forth in claim 17, wherein said step of sensing the position of said piston within said piston cylinder involves triggering said magnetic switch located adjacent each of said first and said second positions within said piston cylinder with a magnet carried by said piston.

19. The method set forth in claim 16, including the steps of:
   (e) detecting when said piston moves from said second position to said first position within said piston cylinder;
   (f) monitoring the time said piston remains at said first position without appliance activity and comparing such time with an established desired operating time;
   (g) providing an alarm alerting to the presence of sustained gas flow after said established desired operating time.

* * * * *

UNITED STATES PATENT AND TRADEMARK OFFICE
CERTIFICATE OF CORRECTION

PATENT NO. : 9,035,781 B2  Page 1 of 1
APPLICATION NO. : 13/561514
DATED : May 19, 2015
INVENTOR(S) : David A. Struyk It is certified that error appears in the above-identified patent and that said Letters Patent is hereby corrected as shown below:

In The Claims

Column 16, Claim 16, Line 2 of element (d), please insert --during operation-- directly after "gas".

Signed and Sealed this
Twenty-third Day of February, 2016

Michelle K. Lee
*Director of the United States Patent and Trademark Office*